(12) United States Patent
Schütz

(10) Patent No.: US 8,602,056 B2
(45) Date of Patent: Dec. 10, 2013

(54) COAXIAL COUPLING

(75) Inventor: Christiaan Arnold Schütz, Da Raamsdonksveer (NL)

(73) Assignee: N.V. Holmatro, Raamsdonksveer (NL)

(*) Notice: Subject to any disclaimer, the term of this patent is extended or adjusted under 35 U.S.C. 154(b) by 0 days.

(21) Appl. No.: 11/596,252

(22) PCT Filed: May 13, 2004

(86) PCT No.: PCT/NL2004/000325
§ 371 (c)(1),
(2), (4) Date: Jul. 16, 2007

(87) PCT Pub. No.: WO2005/111492
PCT Pub. Date: Nov. 24, 2005

(65) Prior Publication Data
US 2007/0289645 A1 Dec. 20, 2007

(51) Int. Cl.
*F16L 29/04* (2006.01)
(52) U.S. Cl.
USPC .................. 137/614.03; 137/614.05
(58) Field of Classification Search
USPC ......... 137/614.01, 614.03, 614.04, 594, 595, 137/614, 614.05; 285/123.15, 123.16, 316, 285/317; 251/149.1, 149.6
See application file for complete search history.

(56) References Cited

U.S. PATENT DOCUMENTS

| | | | | |
|---|---|---|---|---|
| 2,348,478 A * | 5/1944 | Jones | | 137/614.04 |
| 2,471,798 A * | 5/1949 | Thomas | | 137/614.03 |
| 3,211,178 A | 10/1965 | Kiszko | | |
| 4,763,683 A * | 8/1988 | Carmack | | 137/614.04 |
| 4,922,971 A * | 5/1990 | Grantham | | 285/123.15 |
| 5,433,247 A * | 7/1995 | Guertin | | 137/614.04 |
| 5,615,706 A * | 4/1997 | Guertin | | 137/614.04 |
| 6,170,522 B1 * | 1/2001 | Tanida | | 137/614.02 |
| 6,179,001 B1 | 1/2001 | Schutz | | |
| 6,192,934 B1 * | 2/2001 | Coates et al. | | 137/614.04 |
| 7,044,155 B2 * | 5/2006 | Zanolin et al. | | 137/614.04 |
| 7,147,003 B2 * | 12/2006 | Maldavs | | 137/614.04 |
| 2001/0004904 A1 * | 6/2001 | Horton et al. | | 137/614.03 |
| 2004/0244848 A1 * | 12/2004 | Maldvas | | 137/614.04 |

* cited by examiner

*Primary Examiner* — Eric Keasel
*Assistant Examiner* — Craig J Price
(74) *Attorney, Agent, or Firm* — Harness, Dickey & Pierce, P.L.C.

(57) ABSTRACT

A coaxial coupling comprising a female part and a male part which are couplable to each other is disclosed. The female part and the male part having an inner passage and a concentric outer passage, wherein the inner passage of the female part is fluidly connected to the inner passage of the male part and the outer passage of the female part is fluidly connected to the outer passage of the male part in the coupled state of the coupling, one of the parts further comprising a by-pass valve that guides the fluid flow internally from the inner passage to the outer passage thereof in a non-coupled state of the coupling, the other part comprising an activator for activating the by-pass valve during coupling of the two parts wherein the by-pass valve is adapted to guide the fluid flow from the inner passage of the one part to the inner passage of the other part during coupling of the two parts.

21 Claims, 7 Drawing Sheets

COAXIAL COUPLING

This invention relates to a coaxial coupling, i.e. a coupling having a concentric configuration, and especially to a quick connect coaxial coupling.

Similar couplings are known from various patents, such as U.S. Pat. No. 6,179,001. They are designed to allow the quick connection or disconnection of two separate fluid lines, transporting for instance a gas or a liquid, with a minimum fluid spillage. These couplings are typically used in double acting hydraulic systems where flexible lines (hoses) are applied to transfer the fluid from a driving element, such as a hydraulic pump, to an operating element, such as a hydraulic tool. For double acting hydraulic operating elements, such as double acting hydraulic cylinders, at least two separate fluid lines are required to transport the fluid from the operating element (pump) to the cylinder whilst at the same time the residual fluid present in the cylinder must be transported back to the operating element (pump) to achieve a movement of the piston in the hydraulic cylinder. A valve between the driving element and the operating element is applied to direct the fluid flow through the lines and alter the direction of the fluid flow to achieve an opposite movement of the piston in the hydraulic cylinder. The fluid lines will both have to transport pressurized fluid depending on the position of the valve.

From U.S. Pat. No. 6,179,001 a coaxial coupling having a concentric configuration is known comprising a male part connected to a first and third conduit and a female part connected to a second and a fourth conduit for releasable mutual connection, each comprising a one piece outer shell, connecting channels and an end face at an end thereof. At least portions of the connecting channels in both male and female part are concentric and the end faces of the elements of both parts are located in a single plane.

For certain specific applications, such as portable hydraulic rescue equipment where the double acting hydraulic system comprises a control valve on the operating element (tool) itself to control the directions of the fluid flow into the cylinder ports, the coupling from U.S. Pat. No. 6,179,001 is not suitable. The operation and the sequence of the internal valve parts in that coupling with the aim to connect the fluid channels with each other is too complicated and can cause trapped pressure which is unwanted in the specific field of application. Next the design includes many different sliding or moving parts/bushings (eight in total), seals (eight in total) and springs (nine in total), all to be activated by the insertion of the coupling parts into each other, resulting in relatively much friction thus making it almost impossible to couple the parts by hand.

The object of the present invention is to obviate the above stated problems.

This object is achieved in that one part (preferably the female part) of the coupling is attached to the driving element and provided with just a by-pass valve which is capable of directing the fluid flow from the inner pressure passage to the outer concentric return passage whilst this one part and the other part (preferably the male part) are not yet coupled together. Next the design is simplified only using less moving parts (four in total), less seals for the valve functions (five in total) and less springs (five in total).

During the coupling different steps will cause different actions from the by-pass valve in the female part and more valves in the male part.

The object of the different steps and the related actions is to minimize the required force for the coupling and to prevent unwanted pressure build-up in enclosed fluid chambers.

BRIEF DESCRIPTION OF THE ABBREVIATIONS AND REFERENCE NUMBERS

Figure 1:
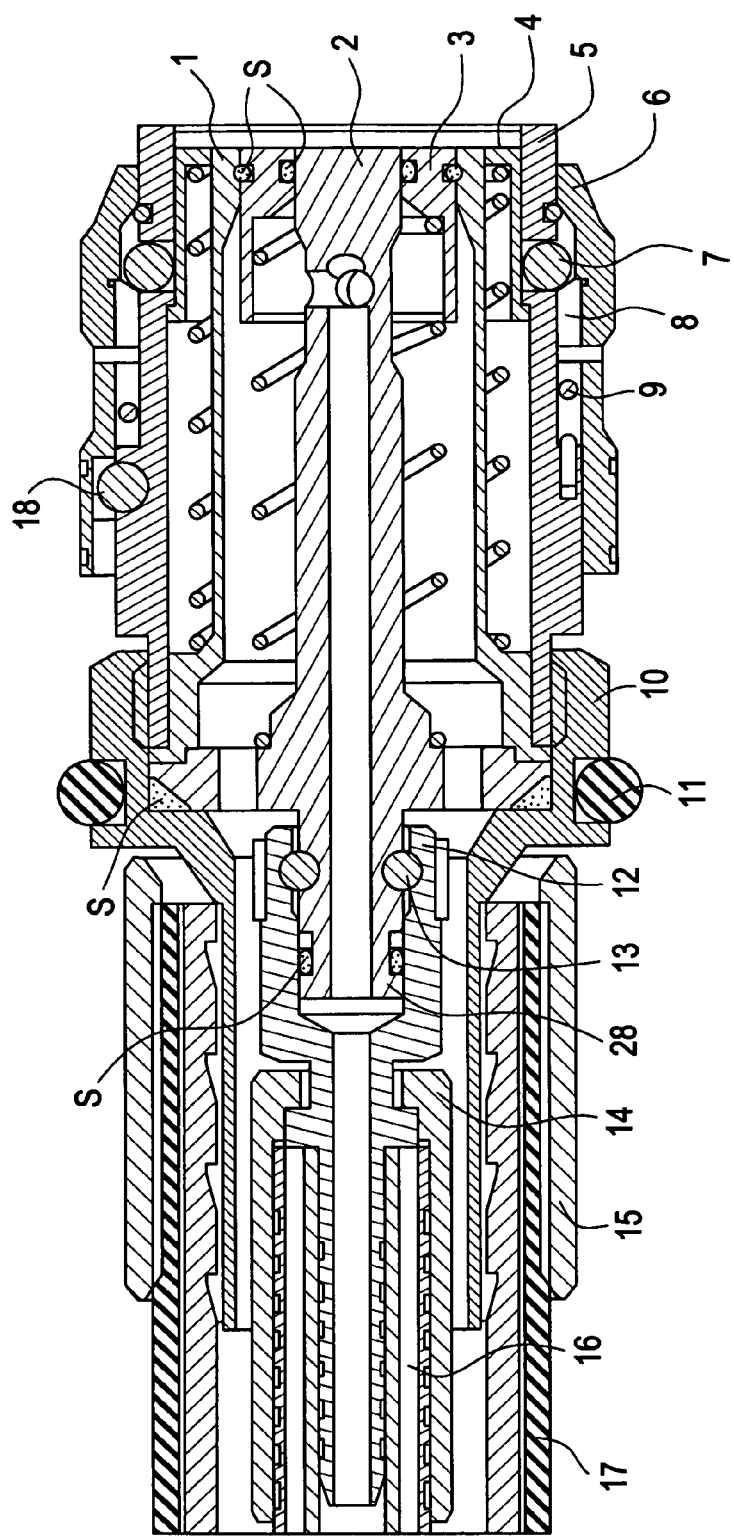
FIG. 1 longitudinal sectional view of a female part of a coupling according to the invention connected to a coaxial hose assembly, FIG. 2 longitudinal sectional view of the female part of FIG. 1 connected to a connection block, FIG. 3 longitudinal sectional view of a male part of a coupling according to the invention connected to a coaxial hose assembly, FIG. 4 longitudinal sectional view of the male part of FIG. 3 connected to a connection block, FIG. 5 longitudinal sectional view of the female part and male part of FIGS. 1 and 3 respectively, partially coupled, FIG. 6 longitudinal sectional view of the female part and male part of FIGS. 1 and 3 respectively, halfway coupled, and FIG. 7 longitudinal sectional view of the female part and male part of FIGS. 1 and 3 respectively, fully coupled.

S indicates the various types of sealing elements
L.P. means Low Pressure and stands for the outer passage i.e. return line
H.P. means High Pressure and stands for the inner passage, i.e. pressure line
1 Female sleeve
2 Valve stem
3 By-pass valve
4 Ball sleeve
5 Female body
6 Locking sleeve
7 Locking ball
8 Ring
9 Torsion spring
10 Hose fitting
11 O-ring
12 Hose adapter
13 Lock pin
14 Inner ferrule
15 Outer ferrule
16 H.P. hose
17 L.P. hose
18 Ball stop
19 Connection block
21 Male L.P. valve
20 Male body
22 Male sleeve
23 Male H.P. valve
24 Male adapter
25 Male L.P. fitting
26 O-ring
27 Connection Block
28 Female adapter
30 first valve seat
31 second valve seat

DETAILED DESCRIPTION OF THE FIGURES AND PREFERRED EMBODIMENT

FIG. 1 shows a longitudinal sectional view of a preferred embodiment of a uncoupled female part of a coaxial coupling, wherein the female part is connected to a coaxial hose assembly 16,17 by means of a torsion-free high pressure hose connector 12,13 and a threaded low pressure hose fitting 10 screwed onto female body 5. The fluid from the pressure passage flows back to the container (tank) of the drive element (pump) as is shown with arrows due to the position of the by-pass valve 3.

Figure 2:
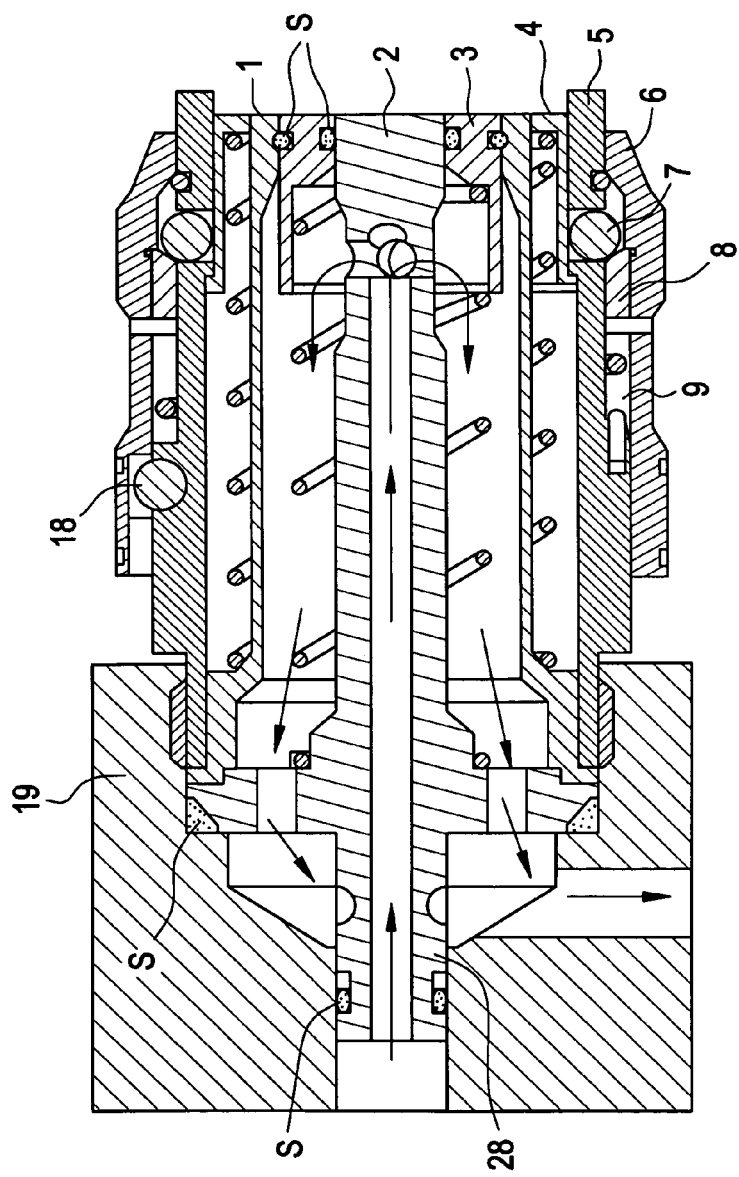

FIG. 2 shows the same uncoupled female part mounted to a connection block 19 of a driving element (pump) without using any additional parts.

Figure 3:
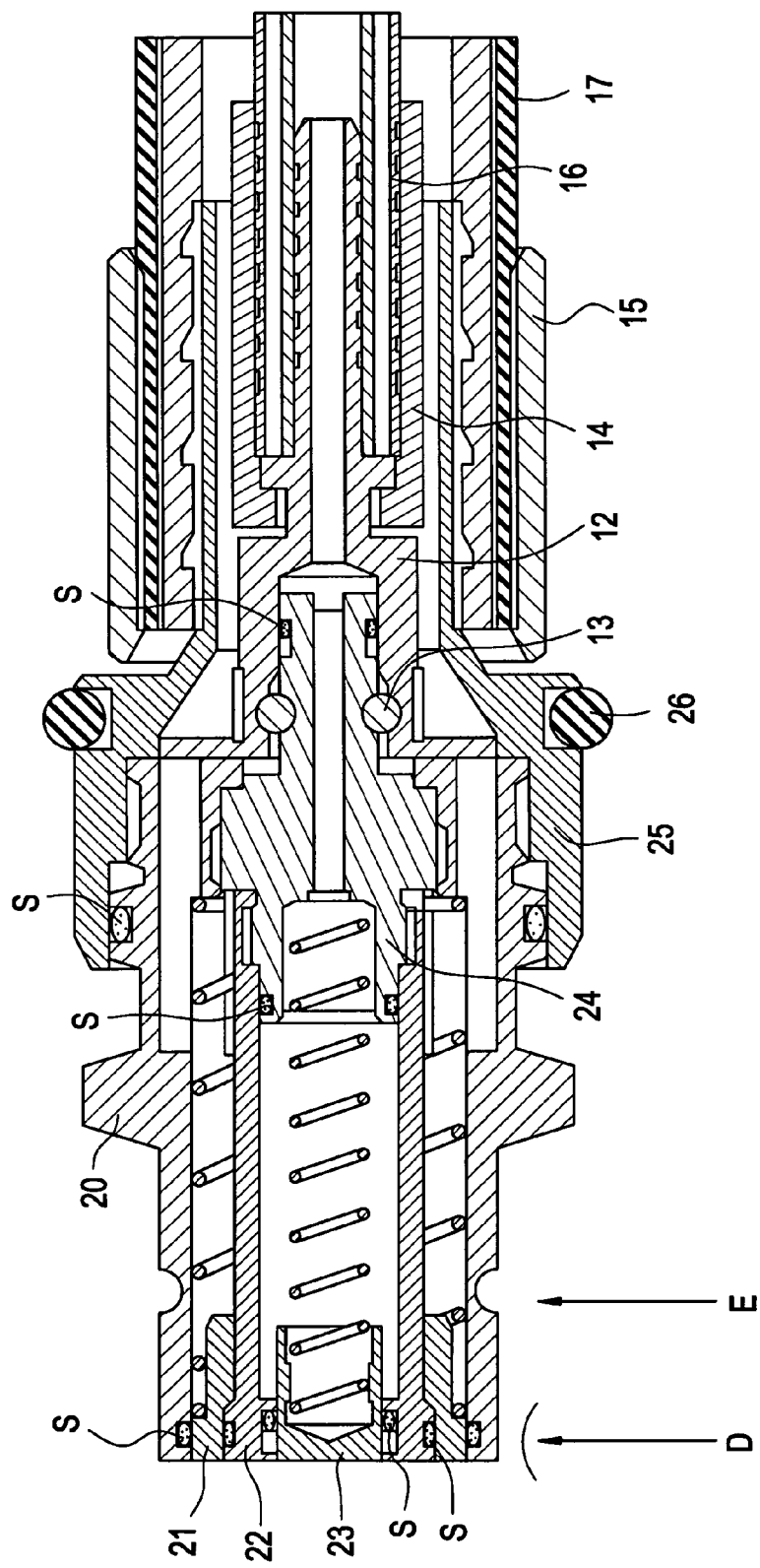

FIG. 3 shows a longitudinal sectional view of the uncoupled male counterpart of the coupling wherein the male part is connected to a coaxial hose assembly 16,17 by means of a torsion-free high pressure hose connector 12,13 and a threaded low pressure hose fitting 25 screwed onto the male body 20. At point D a special concave form is provided to ease insertion and provide a guidance when inserting the male part into the female part. At point E the groove is shown that is part of the locking mechanism when both parts are fully coupled.

Figure 4:
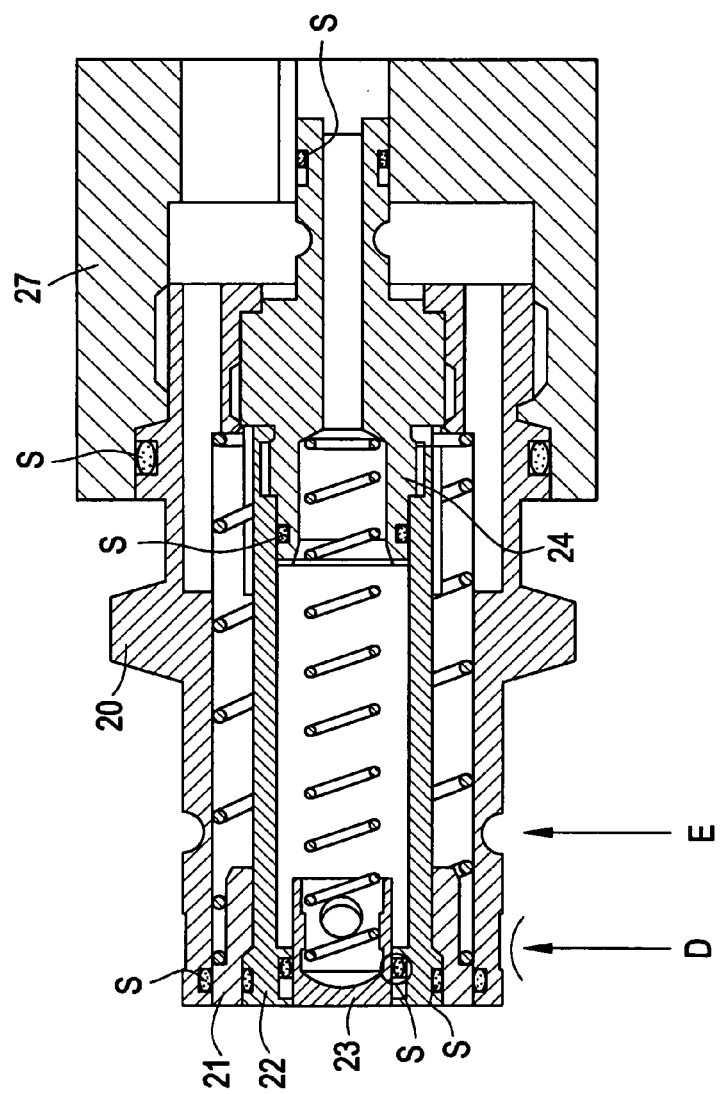

FIG. 4 shows the same uncoupled male part connected to a connection block 27 of an operating element (tool).

Figure 5:
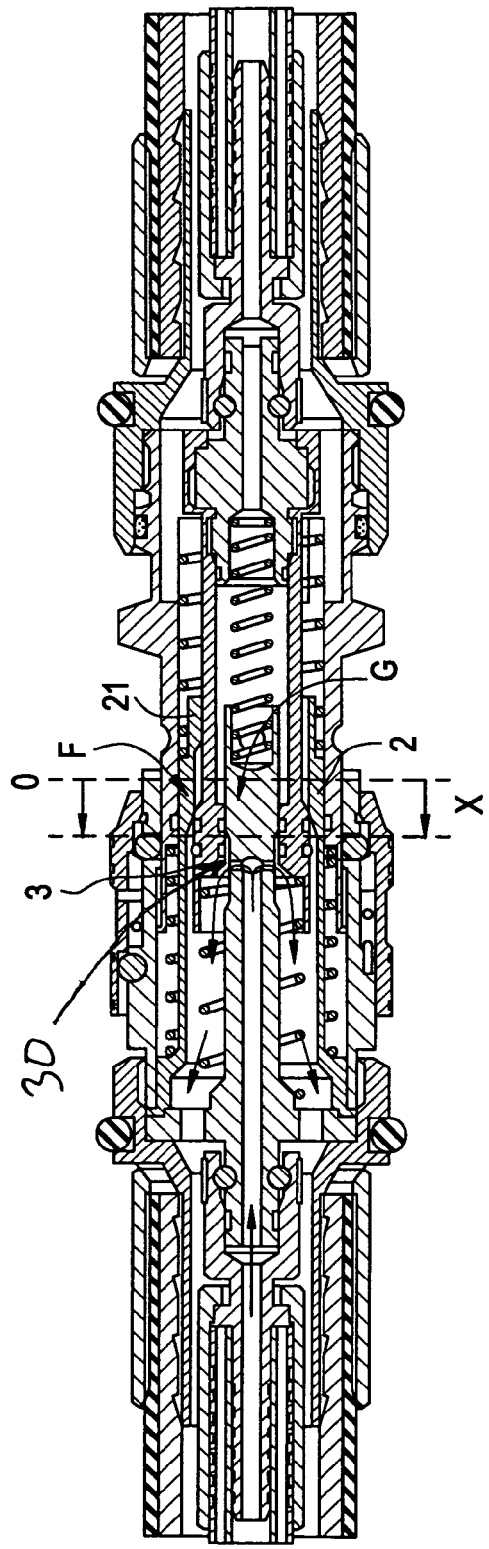

FIG. 5 shows both female and male parts during step A. The male part is inserted partially into the female part. The female sleeve 1 of the female part pushes the male L.P valve 21 inwards. This connects the outer passages of both parts at point F. The male sleeve 22 in its turn pushes the by-pass valve 3 in the female part out of its seat 30 (shown at G) allowing the fluid from the inner pressure passage to flow to both the outer passage of the male part as well as to the outer return passage of the female part. Since both return passages are connected together and also still connected to the inner pressure passage, no pressure is built-up in the coupling system.

Figure 6:
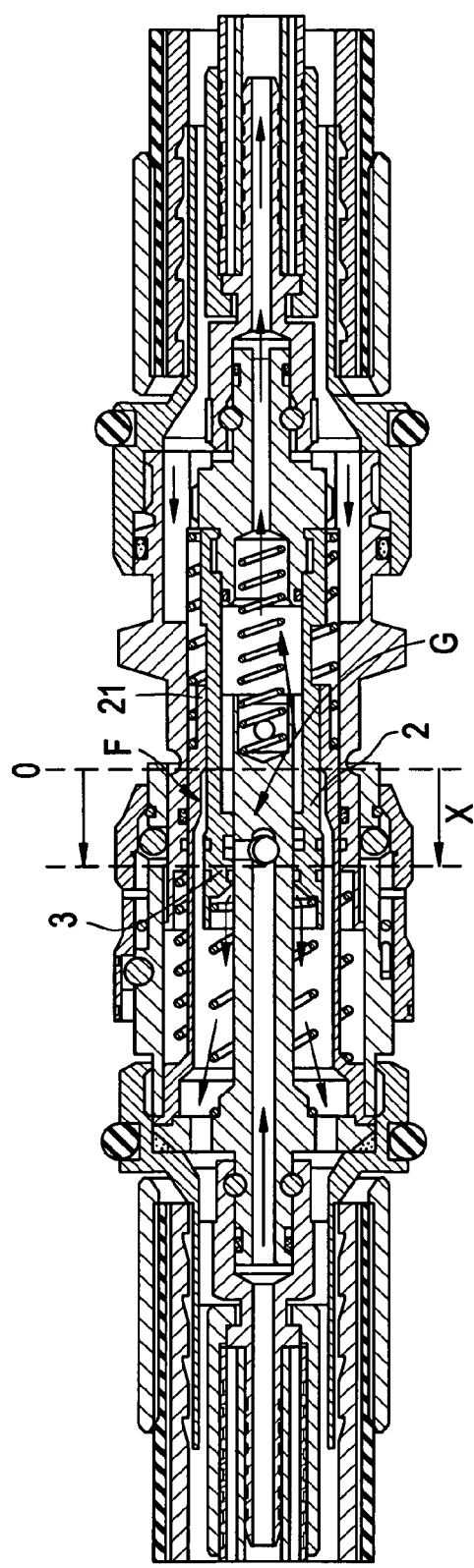

FIG. 6 shows the same coupling halfway coupled at step B. The male part is inserted further into the female part. By-pass valve 3 has now opened the fluid passage to the inner male passage. The outer return passages are still connected with each other and also with the inner pressure passage. All passages are connected to each other and again no pressure is build-up in the coupling system.

Figure 7:
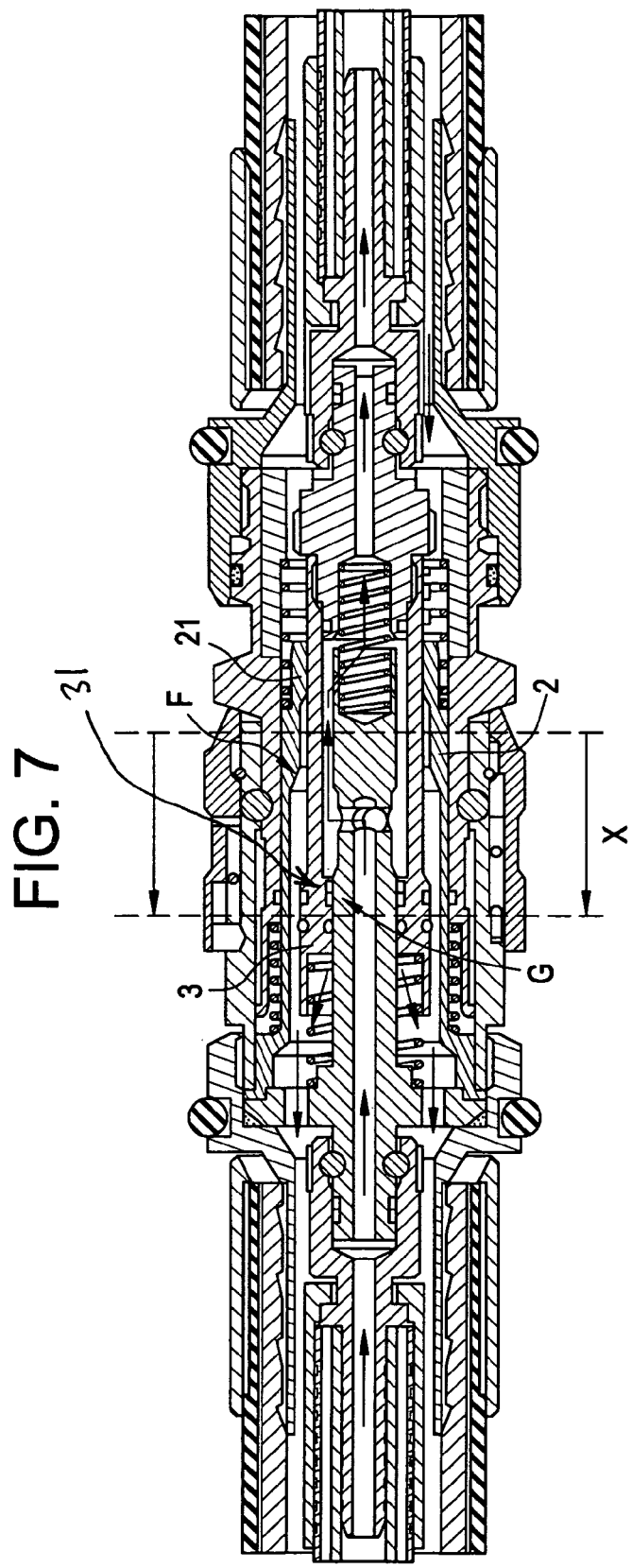

FIG. 7 shows the same parts now fully coupled as step C. The male part has reached its final position. By-pass valve 3 is now in its other seat 31 and has now closed off the fluid passage at point G, which means that the fluid flow from the inner passage will only flow into the male inner passage. At the same time the outer return passages are still connected together.

Since there is no fluid circulation in the operating element (tool) of hydraulic rescue systems whilst not coupled, the male part attached to such an operating element (tool) does not require an integral by-pass valve. This principle allows the design of a less complicated and much more compact coaxial coupling and coupling system.

According to the preferred embodiment the female part is always attached to the outgoing line connection from the driving element (pump) and the male counterpart of the quick-connect coupling is always attached to the incoming line connections from the operating element (hydraulic tool, such as a spreader or cylinder).

Flexible conduits (hoses) of a variety of lengths with a female part mounted at one end and a male part at the other end will provide the connection between the driving element (pump) and the operating element (tool).

Preferably in the case of portable double acting hydraulic rescue equipment, the inner concentric passage will be the pressure line, whereas the surrounding passage will form the return line, i.e. the non-pressure return line to the fluid container (tank). This set up will provide many advantages for the system compared to prior art coupling systems. Typically the cylinders in these double acting rescue tools use their main force when the piston is advanced which results in large surface area ratios. Ratios of 3,5:1 are not uncommon which means that 3,5 times more fluid is returned to the fluid container (tank) when a piston of these cylinders is retracted. A coaxial coupling system with a compact inner pressure passage and a larger size outside return passage automatically offers these fluid capacity advantages with the least dimensional effects.

Next a coaxial coupling system offers more safety for the users. In case of a pressure line failure, fluid spillage and/or hazardous fluid ejection is prevented through the surrounding outside return line.

Portable double acting hydraulic rescue equipment is used with various lengths of connection lines (hoses). Prior art couplings, without an integrated by-pass valve, attached to the two separate flexible conduits (hoses), require users to return to the driving element (pump) to stop the flow of fluid by means of a valve at the driving element (pump) prior to be able to disconnect such prior art coupling from an operating element (tool) in order to connect another operating element (tool). This action is time consuming and neglecting the proper procedure will definitely result in damaged equipment and/or inoperative equipment. When lives are at stake, this is not acceptable.

Using the coaxial coupling and coupling system according to the invention, there is no need to switch a valve at the driving element (pump) in order to stop the fluid flow through the system. This means that the user can quickly disconnect one operating element (tool) and connect another operating element (tool) without the need to return to the driving element to deactivate and reactivate the fluid flow through the system.

According to the preferred embodiment both the female and male parts are furthermore provided with an adapter 28 resp. 24 to allow the fixation to a body i.e. a connection block 19, 27 at a driving or operating element, or to a flexible conduit such as a coaxial hose assembly 16,17 without the need of additional parts. The typical adapter connection is required to provide a torsion-free mounting of the threaded socket of the outer L.P. hose 17. The adapter 28,24 is locked in position on the hose adapter 12 by means of two radial lock pins 13. The lock pins 13 can be connected to each other into a substantially U-shaped element.

The invention claimed is:
1. A coaxial coupling comprising:
a pressure feeding part and a pressure receiving part which are coupleable to each other, the pressure feeding part and the pressure receiving part each having an inner passage and a concentric outer passage, wherein the inner passage of the pressure feeding part is fluidly connected to the inner passage of the pressure receiving part and the outer passage of the pressure feeding part is fluidly connected to the outer passage of the pressure receiving part in the coupled state of the coupling;
a by-pass valve, in the pressure feeding part, that guides the fluid flow internally from the inner passage to the outer passage thereof in a non-coupled state of the coupling;
an activator in the pressure receiving part for activating the by-pass valve during coupling of the two parts; and
an outer passage connecting valve that connects the outer passage of the pressure feeding part with the outer passage of the pressure receiving part upon coupling of the pressure feeding part and the pressure receiving part, wherein the coaxial coupling is configured such that during coupling the outer passage connecting valve is opened connecting the outer passages of the pressure feeding part and the pressure receiving part prior to the connection of the inner passages of the pressure feeding part and the pressure receiving part, and wherein during coupling the by-pass valve opens the inner passages of the pressure feeding part and the pressure receiving part while the outer passages remain connected to each other such that all passages are connected to each other.

2. The coaxial coupling as claimed in claim 1, further comprising a by-pass channel provided between the inner passage and the outer passage in the pressure feeding part and two seats at both sides of the by-pass channel, wherein the activator moves the by-pass valve from the first to the second seat during coupling of the two parts.

3. The coaxial coupling as claimed in claim 1, wherein the pressure feeding part is connectable via a coaxial hose assembly consisting of an inner hose and a concentric outer hose to a driving element.

4. The coaxial coupling as claimed in claim 3, wherein the driving element is a pump.

5. The coaxial coupling as claimed in claim 1, wherein the pressure receiving part is connectable via a coaxial hose assembly consisting of an inner hose and a concentric outer hose to a hydraulic operating element.

6. The coaxial coupling as claimed in claim 5, wherein the hydraulic operating element is a rescue tool.

7. The coaxial coupling as claimed in claim 1, wherein the pressure feeding part is a female part and the pressure receiving part is a male part.

8. The coaxial coupling as claimed in claim 1, wherein at least one of the pressure feeding part and the pressure receiving part includes an inner hose connecting element, a concentric outer hose connecting element and rotational connecting element for connecting the inner hose connecting element to an inner hose of a coaxial hose assembly.

9. The coaxial coupling as claimed in claim 8, wherein the outer hose connecting element includes a threaded part for connection with the outer hose of the coaxial hose assembly.

10. The coaxial coupling as claimed in claim 1, wherein an outer surface of at least one of the pressure feeding part and the pressure receiving part is provided with a groove to hold an O-ring.

11. The coaxial coupling as claimed in claim 1, wherein the pressure receiving part has at least one of a tapered and a concave cylindrical outer shape.

12. The coaxial coupling as claimed in claim 1, wherein the coaxial coupling is configured to prevent pressure build-up in the coupling system as fluid flows from the inner passage to the outer passages of both parts during the coupling of the two parts.

13. The coaxial coupling as claimed in claim 1, wherein the outer passage connecting valve is concentrically outside of the activator.

14. The coaxial coupling as claimed in claim 1, wherein the by-pass valve includes a first position connecting the inner and outer passages of the pressure feeding part, a second position connecting the inner passages and the outer passages of the pressure feeding part and the pressure receiving part, and a third position closing a connection between the inner and outer passages.

15. The coaxial coupling as claimed in claim 1, wherein the outer passage connecting valve is configured to prevent a build-up of pressure in the coaxial coupling.

16. The coaxial coupling as claimed in claim 1, wherein during coupling the outer passages of the pressure feeding part and the pressure receiving part are connected while a valve in the inner passage of the pressure receiving part remains closed thereby isolating the inner passage of the pressure receiving part from the inner and outer passages of the pressure feeding part.

17. The coaxial coupling as claimed in claim 1, wherein during coupling the inner and outer passages of the pressure feeding part remain open to one another.

18. The coaxial coupling as claimed in claim 1, wherein the by-pass valve is adapted to guide the fluid flow from the inner passage of the pressure feeding part to the outer passages of both parts during coupling of the two parts.

19. The coaxial coupling as claimed in claim 1, wherein the outer passage connecting valve is opened fully during coupling.

20. The coaxial coupling as claimed in claim 1, wherein the inner passage is a pressure line and the outer passage is a return line.

21. The coaxial coupling as claimed in claim 1, wherein the activator in the pressure receiving part is configured to push the by-pass valve in the pressure feeding part from a sealing position to an unsealed position allowing a high pressure fluid from the inner passage to flow to both the outer passage of the pressure receiving part and to an outer fluid return passage of the pressure feeding part.

\* \* \* \* \*